United States Patent
Lin et al.

(10) Patent No.: US 8,251,632 B2
(45) Date of Patent: Aug. 28, 2012

(54) SYSTEM FOR TRANSPORTING PLANAR SOFC STACK

(75) Inventors: Hunh-Hsiang Lin, Taoyuan County (TW); Ruey-Yi Lee, Taoyuan County (TW); Yung-Neng Cheng, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 336 days.

(21) Appl. No.: 12/647,062

(22) Filed: Dec. 24, 2009

(65) Prior Publication Data

US 2011/0110754 A1  May 12, 2011

(30) Foreign Application Priority Data

Nov. 6, 2009 (TW) .................................. 98137710 A

(51) Int. Cl.
*B25J 9/10* (2006.01)
(52) U.S. Cl. ...................................................... 414/590
(58) Field of Classification Search .................. 414/486, 414/590, 800, 940
See application file for complete search history.

(56) References Cited

U.S. PATENT DOCUMENTS

| | | | | | |
|---|---|---|---|---|---|
| 4,229,136 | A | * | 10/1980 | Panissidi | 414/673 |
| 5,163,802 | A | * | 11/1992 | Poinelli | 414/555 |
| 5,332,013 | A | * | 7/1994 | Sugita et al. | 141/98 |
| 5,570,990 | A | * | 11/1996 | Bonora et al. | 414/543 |
| 5,626,353 | A | * | 5/1997 | Campbell | 280/47.35 |
| 5,700,127 | A | * | 12/1997 | Harada et al. | 414/416.08 |
| 5,746,262 | A | * | 5/1998 | Baumgartner | 144/24.13 |
| 6,679,534 | B2 | * | 1/2004 | Schulte | 294/211 |
| 6,942,139 | B2 | * | 9/2005 | Lipnevicius | 228/102 |
| 7,525,276 | B2 | * | 4/2009 | Eaton | 318/581 |

* cited by examiner

*Primary Examiner* — Charles A Fox
(74) *Attorney, Agent, or Firm* — WPAT, PC; Justin King

(57) ABSTRACT

A system for transporting planar SOFC stack is disclosed, which comprises: a frame, for carrying a cell stack; a robotic arm, for grabbing and holding the cell stack; and a driver, coupled to the frame and the robotic arm and being used for driving the robotic arm. With the aforesaid system, the cell stack can be moved in and out of a high temperature furnace smoothly and rapidly, and then into a fuel cell control system, maintaining balance and stability of the cell stack.

28 Claims, 4 Drawing Sheets

SYSTEM FOR TRANSPORTING PLANAR SOFC STACK

FIELD OF THE INVENTION

The present invention relates to a system for transporting planar solid oxide fuel cell (SOFC) stack, and more particularly, to a transportation system adapted for moving a SOFC stack in and out of a high temperature furnace and then into a fuel cell control system smoothly and rapidly.

BACKGROUND OF THE INVENTION

The scope of solid oxide fuel cell (SOFC) applications within industry have expanded rapidly in recent years. This is because it can provide many advantages over traditional energy conversion systems including: tolerance to high temperature, high energy conversion efficiency, environmental friendly, and so on. It is noted that for preparing any common fuel cell for performance test or generating electricity, its fuel as well as air streams must be preheated to a designated operating temperature, which can be as high as 600° C. to 1000° C. As the SOFC is usually operating at extremely high temperatures and it is usually an assembly composed of elements made of brittle materials, such as planar cells, mica sheets and glass cement, it is important to take special precaution in view of the stability and integrality of a SOFC stacks when it is being transmitted.

It is noted that for preparing any common fuel cell for performance test or generating electricity, its fuel as well as air streams must be preheated to a designated operating temperature, which can be as high as 600° C. to 1000° C. for SOFCs, before they can be fed into the fuel cell stack. Conventionally, such preheating is performed in a manner that: after the assembling of a SOFC stack is completed, it is subjected to a load for stabilizing the same from tipping over for preparing the same to be move into a high-temperature furnace where it is heated to its designated operating temperature; and then, after performing a performance test upon the heated SOFC stack, it is cooled down and then moved out of the furnace manually to enter a control system while still under the stabilization of the load. However, it is noted that the whole transportation process of the SOFC stack must be performed with extreme care for preventing the SOFC stack from being damaged by tipping over, accidental collision or dropping. As the combined weight of the SOFC stack and its load can be too heavy to be move manually and at the same time trying to prevent the same from being damaged by tipping over, accidental collision or dropping, the use of any conventional manual method for transporting SOFC stack can be a very difficult task. Accordingly, there is already a transporting device adapted for transporting SOFC stacks in a safe and smooth manner, as the one shown in FIG. 1. In FIG. 1, the cell stack 1, being transported out of the gate 71 of a high-temperature furnace 71 after completing a performance test and cooling down, is sandwiched between a top plate 2 and a bottom plate 3, in which there are fixing rods being screwed on the top plate 2 and the bottom plate 3 for coupling the two to each other, whereas there are springs being arranged between the top plate 2 and their corresponding fixing rods 4 to be used for providing proper static loads. In addition, the cell stack 1 is integrated with a lifting device 9 by the use of four holding parts 91 fixedly secured to the four sides of the cell stack 1. Thereby, as soon as a crane 61 of a movable seat 6 is controlled to move into the high-tempera- ture furnace 7 for connecting the joint 62 on the crane 61 with the lifting device 9, the movable seat 6 can be directed to move back for retrieve the cell stack 1 from the base 72 of the high-temperature furnace 7 and thereafter transport the cell stack 1 to a carrier 8. Thereafter, the carrier 8 can carry the cell stack 1 to a fuel cell control system.

Accordingly, there is already a transporting device adapted for transporting SOFC stacks in a safe and smooth manner, as the one shown in FIG. 1. IN FIG. 1, the cell stacks 1, being transported out of the gate 71 of a high-temperature furnace 71 after completing a performance test and cooling down, is sandwiched between a top plate 2 and a bottom plate 3, in which there are fixing rods being screwed on the top plate 2 and the bottom plate 3 for coupling the two to each other, whereas there are springs being arranged between the top plate 2 and their corresponding fixing rods 4 to be used for providing proper static loads. In addition, the cell stack 1 is integrated with a lifting device 9 by the use of four holding parts 91 fixedly secured to the four sides of the cell stack 1. Thereby, as soon as a crane 61 of a movable seat 6 is controlled to move into the high-temperature furnace 7 for connecting the joint 62 on the crane 61 with the lifting device 9, the movable seat 6 can be directed to move back for retrieve the cell stack 1 from the base 72 of the high-temperature furnace 7 and thereafter transport the cell stack 1 to a carrier 8. Thereafter, carrier 8 can carry the cell stack 1 to a fuel cell control system.

The advantage of the aforesaid device is that: by the arrangement of the top plate 2, the bottom plate 3, the fixing rods 4 and the springs 5, a pressure can be exerted uniformly on the cell stack 1 as a kind of protection, and the same time, by the use of the movable seat 6 and the crane 61 for transporting the cell stack 1, the dangers of the cell stack 1 during the conventional manual transportation process, such as being damaged by tipping over, accidental collision or dropping, can be avoided. However, as the carrier 8 is arranged separating from the movable seat 6 and the crane 61, the aforesaid device still has the following shortcomings:

(1) The movements of the movable seat 6, the crane 61, the carrier 8 should be controlled precisely for arranging those device at proper positions corresponding to each other and the high-temperature furnace 7 as well. Otherwise, the collisions between those moving units might be inevitable which not only many working hours will be wasted in the position adjustment of those moving units, but also the test efficiency is adversely affected.

(2) As the movable seat 6 and the carrier 8 are designed to be controlled separately and in an individual manner, it is not efficient with respect to working time.

(3) For smoothing the operation of the aforesaid transportation device, there should be space larger enough for the movable seat 6 and the carrier 8 to move around and occupy, so that the aforesaid transportation device is not suitable for working in a location with restricted space available.

(4) As soon as the carrier 8 carrying the cell stack 1 reaches the fuel cell control system, it is required to use the movable seat 6 and the crane 61 for picking up the cell stack 1 and then placing the same into the fuel cell control system, which can be very time consuming.

SUMMARY OF THE INVENTION

In view of the disadvantages of prior art, the primary object of the present invention is to provide a system for transporting planar solid oxide fuel cell (SOFC) stack, adapted for moving a cell stack in and out of a high temperature furnace and then into a fuel cell control system smoothly and rapidly while preventing the cell stack from being damaged by tipping over, accidental collision or dropping.

To achieve the above object, the present invention provides a system for transporting planar SOFC stack, which comprises: a frame, for carrying a cell stack; a robotic arm, for grabbing and holding the cell stack; and a driver, coupled to the frame and the robotic arm and being used for driving the robotic arm.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
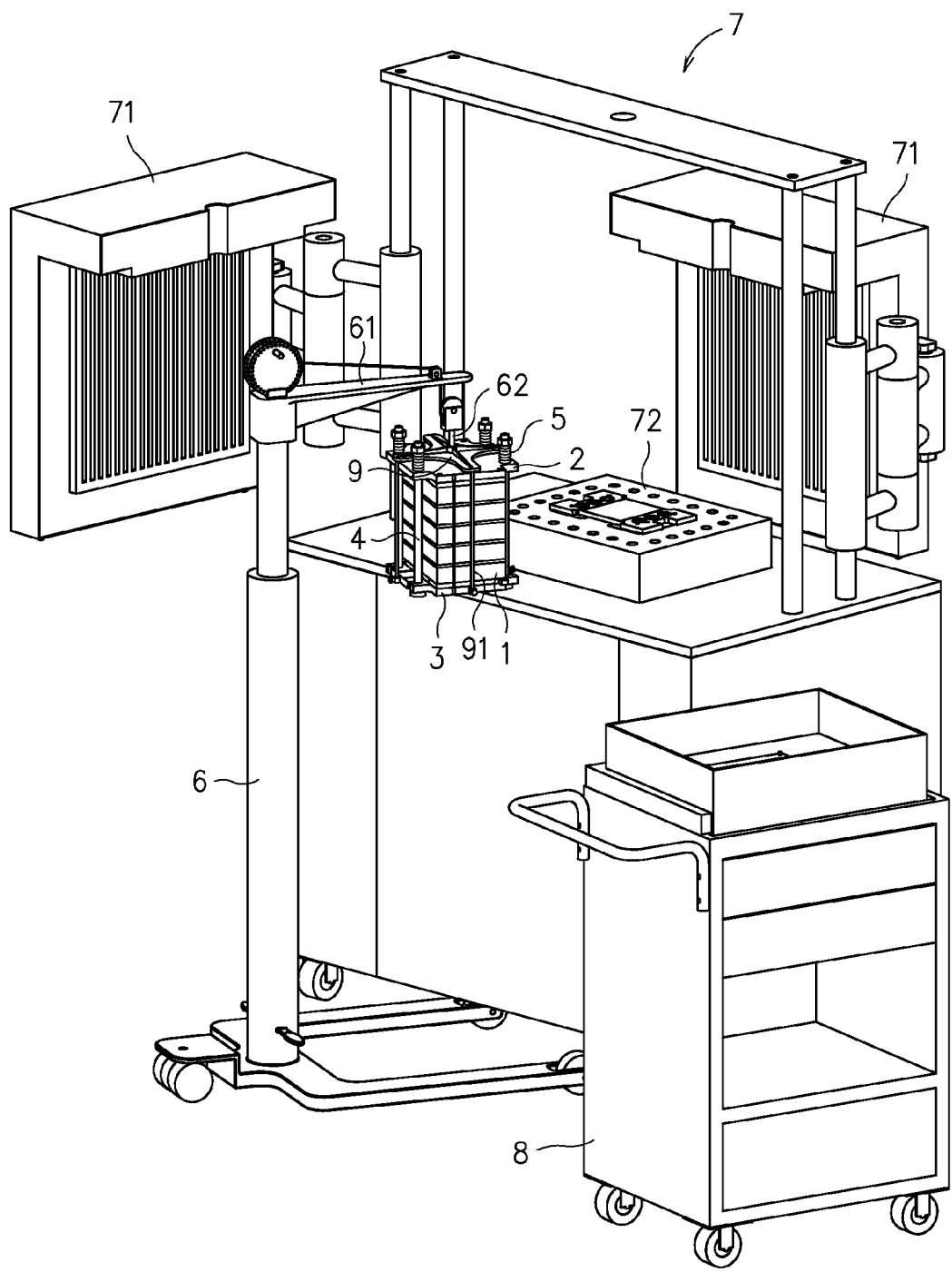
FIG. 1 is a schematic diagram showing a conventional cell stack transportation device in action.
Figure 2:
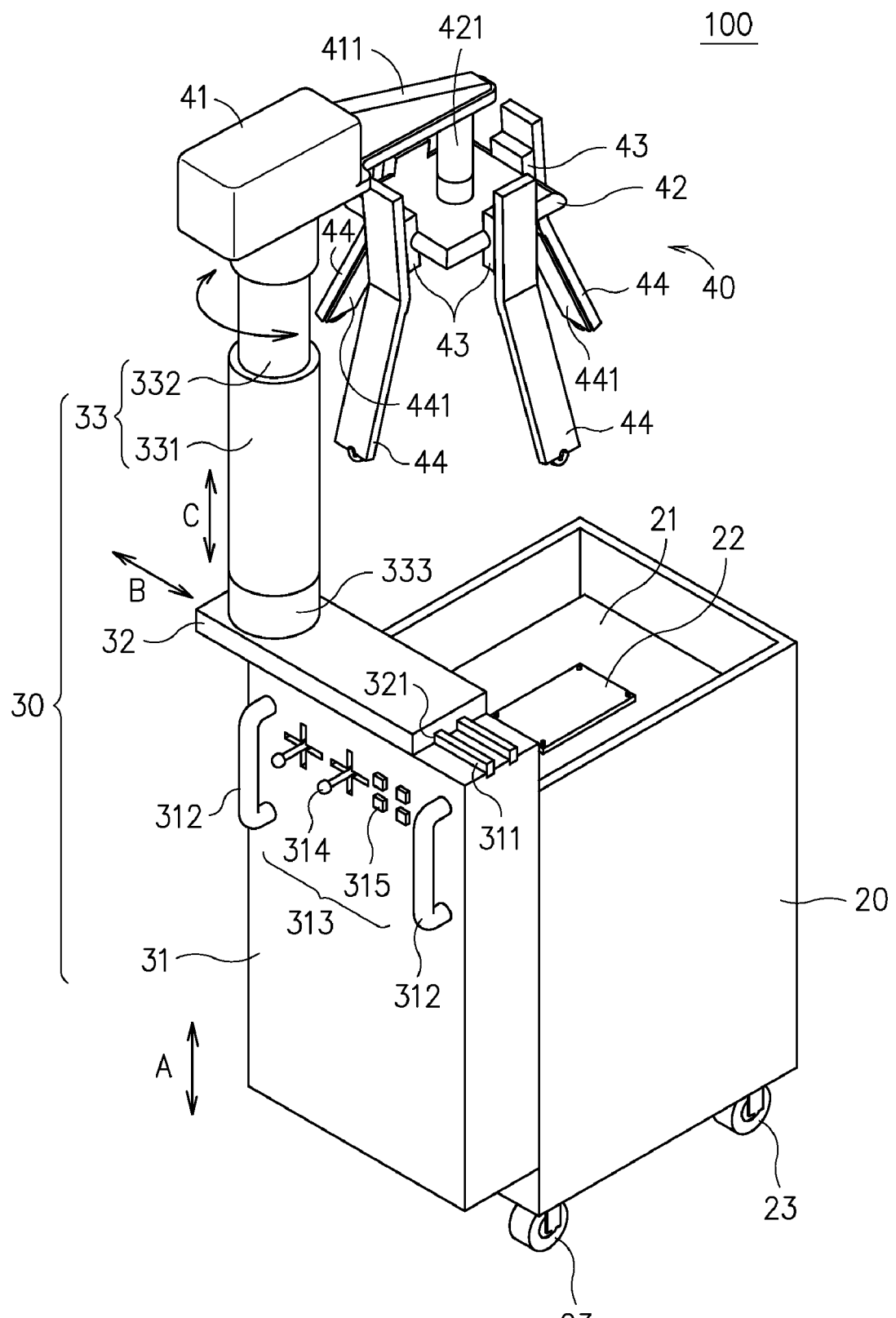
FIG. 2 is a schematic diagram showing a transportation system without holding a cell stack according to an embodiment of the invention.
Figure 3:
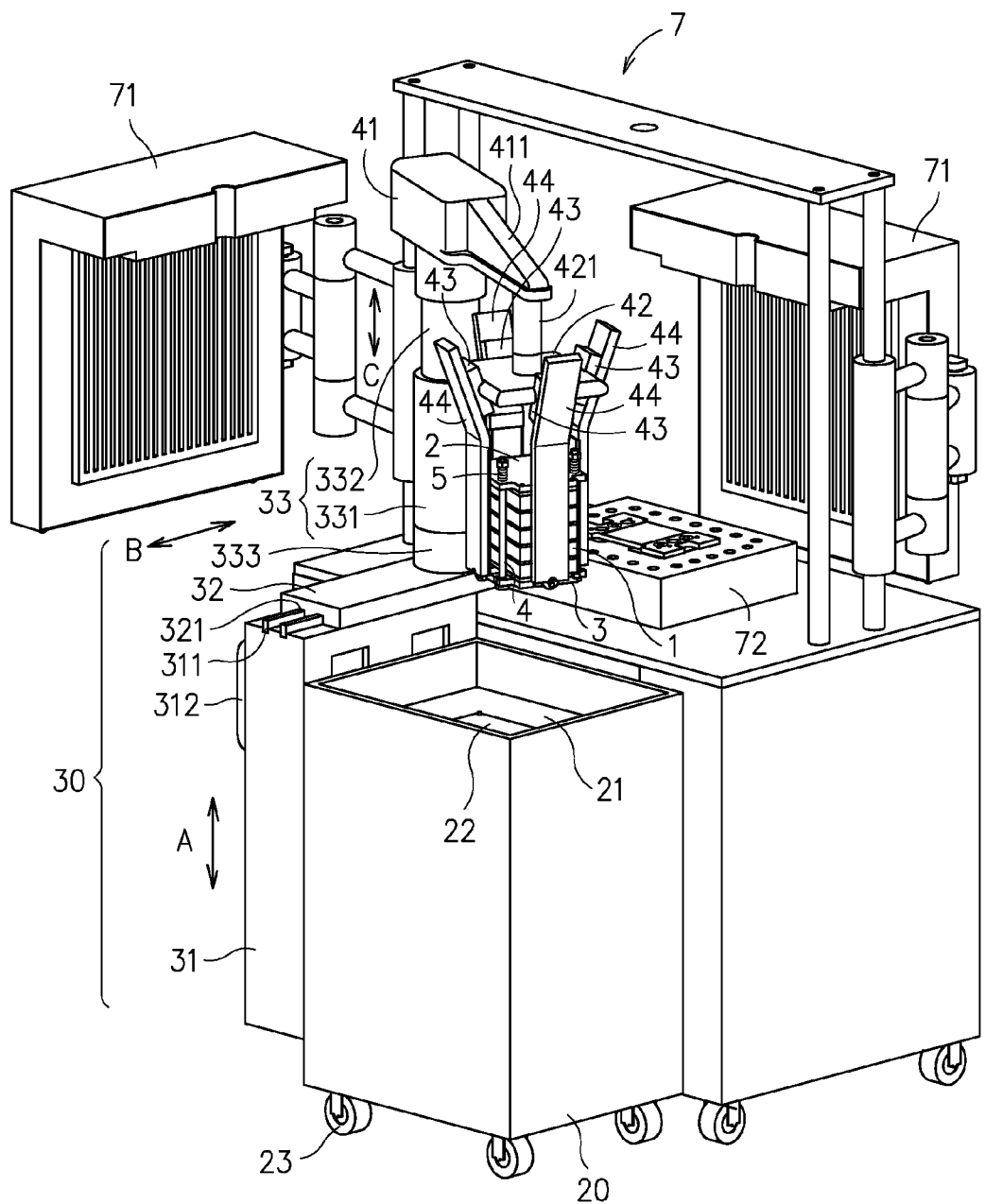
FIG. 3 is a schematic diagram showing a cell stack transportation system in action according to an embodiment of the invention.
Figure 4:
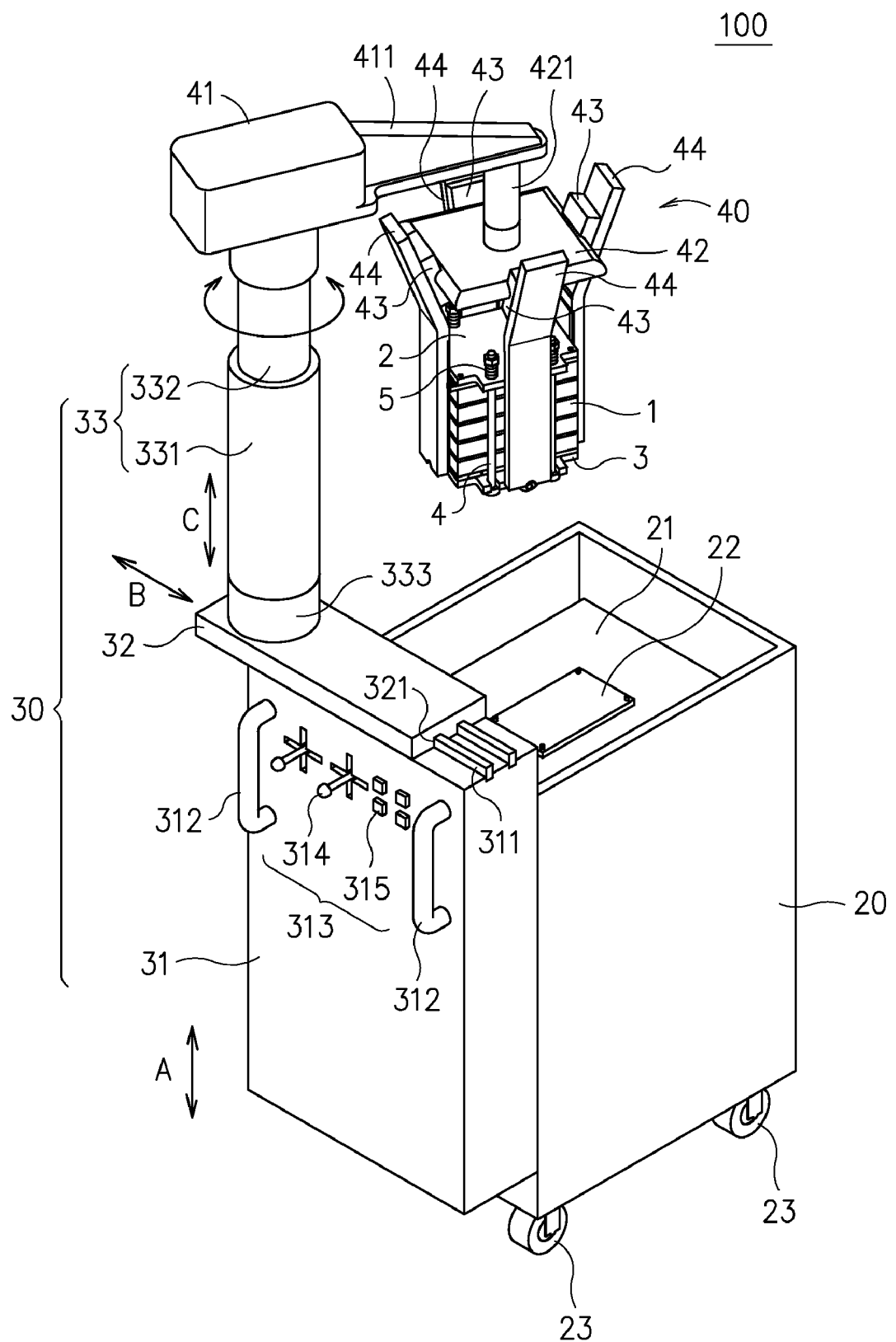
FIG. 4 is a schematic diagram showing a transportation system holding a cell stack according to an embodiment of the invention.

Please refer to FIG. 2 to FIG. 4, which show a system for transporting planar SOFC stack according to an embodiment of the invention. As the embodiment shown in the figures, the system for transporting planar SOFC stack 100 comprises: a frame 20, a driver 30 and a robotic arm 40.

In FIG. 2, there is a deposit area 22 formed at the top of the frame 20, which is provided for carrying a cell stack 1. In addition, the cell stack 1 is fixedly sandwiched between a top plate 2 and a bottom plate 3, between that there are fixing rods 4 being screwed on the top plate 2 and the bottom plate 3 for coupling the two to each other, whereas there are springs 5 being arranged between the top plate 2 and their corresponding fixing rods 4 to be used for providing proper static loads. Moreover, the deposit area 22 is padded with a shock-absorbing foam sponge in a detachable manner for facilitating the same to be replaced according to the size of the cell stack 1 placed thereon. On the other hand, the top 21 of the frame 20 can also be padded with the shock-absorbing foam sponge. By the padding on the deposit area 22 and the top 21 of the frame 20, the cell stack 1 can be prevented from being damaged by tipping over, accidental collision or dropping. In addition, there is a plurality of wheels 23 being configured at the bottom of the frame 20, which is provided for enabling the frame 20 to be movable.

The driver 30, being arranged between the frame 20 and the robotic arm 40, is used for connecting the frame 20 with the robotic arm 40, which includes a first driving element 31, a second driving element 32 and rotary element 33. The first driving element 31, being arranged at a side of the frame, is capable of performing a movement in relative to the movement of the frame 20 in a direction parallel to a first direction A; and the second driving element 32, being arranged at the top of the first driving element 31, is capable of performing a movement in relative to the movement of the first driving element 31 in a direction parallel to a second direction B. Moreover, there are matching sliding chutes 321 and sliding rails 311 sandwiched between the second first driving element 32 and the first driving element 31, that are provided for enabling the second driving element 32 to slide on the top of the first driving element. Similarly, there are matching sliding chutes and sliding rails sandwiched between the first driving element 31 and the frame 20, that are provided for enabling the first driving element 31 to slide at the side of the frame 20. In addition, the rotary element 33 further comprises: a first column 331 and a second column 332, whereas the first and second columns 331, 332 are coaxially arranged while enabling one column selected from the two columns to be ensheathed by the other. In this embodiment, there is a swivel bearing 333 arranged between the first column 331 and the second column 332. Moreover, when the first column 331 is a hollow column that is fixed to the second driving element 32, the second column 332 is coaxially ensheathed inside the first column 331 while enabling the second column 332 to be driven by a driving unit. It is noted that the driving unit is used driving the second column 332 to perform a rotation movement about the axis thereof and an axial movement in its axial direction parallel with a third direction C that it can be a hydraulic device, a pneumatic device or electric motor, etc.

The robotic arm 40 is primarily composed of: a main control 41, a first control unit 42, a plurality of second control units 43 and a plurality of grabbing claws 44 that are electrically connected to each other. Wherein, the main control 41, being disposed at the top of the second column 332 and electrically connected to a control interface 313, is further configured with a cantilever 411 of a specific length. It is noted that extending length of the cantilever 411 is not limited by any restriction that it can be any length at will according to actual requirement. Moreover, the first control unit 42, the plural second control units 43 and the plural grabbing claws 44 are disposed at the bottom of the cantilever 411 in a manner that the first control unit 42 is coupled to the cantilever 411 by a support shaft 421 while arranging the plural second control units 43 and the plural grabbing claws 44 to be fitted to the periphery of the first control element 42. It is noted that each of the plural grabbing claws 44 are provided for one second control unit 43 selected from the plural second control units 43 to disposed thereat. Operationally, the main control 41 is provided for controlling the first control unit 42 and the plural second control unit 43; the first control unit 42 is provided for controlling the plural second control units 43; and the first control unit 42 is arranged allowing the same to rotate about the axis of the support shaft 421 so as to bring along the plural second control units 43 and the plural grabbing claws 44 to rotate in a synchronized manner; and the plural second control units 43 are provided for controlling the stretching of plural grabbing claws 44 in a synchronized manner for grabbing/releasing the cell stack 1. As shown in FIG. 2, each grabbing claw 44 is padded with a foam sponge 441 on a surface thereof that is designed to contact with the cell stack 1 for achieving objects of stabilizing, shock absorbing, and protection. It is noted that the foam sponge 441 can be replaced by other elastic materials for buffering and shock-absorbing.

In this embodiment, since the cell stacks 1 is shaped like a square in general, as the one shown in FIG. 3, the first control unit 42 is shaped like a flat rectangle having four equal sides while enabling each side of the first control unit 42 to be provided for one of the plural second control units 43 and one of the plural grabbing claws 44 to disposed thereat. Nevertheless, the first control unit 42 can be formed in any shaped without being limited thereby.

In this embodiment, there are two handles 312 that are symmetrically arranged at the outer surface of the first driving element 31 to be provided for a user to grab thereat and thus facilitating the user to move the whole transportation system 100. In addition, there is a control interface 313 arranged also at the outer surface of the first driving element 31 that is provided for the user to control the driver 33. The control interface 313 includes at least one joystick 314 and at least control button 315. It is noted that the handles 312 and the control interface 313 are not necessary being arranged at the outer surface of the first driving element 31, and it can be arranged at any location at will, such as at the frame 20 for example.

From the description relating to the structure of the cell stack transportation system 100 with reference to FIG. 3 and FIG. 4, it is concluded that the cell stack transportation system 100 will operate following the steps of:

(1) After performing a performance test upon the heated cell stack 1 in the high-temperature furnace 7 and the furnace 7 is already cooled down, the gate 71 of the furnace 7 is opened while a user grabs the system 100 by the handles 312 and then pushes the system to a location near a side of the furnace 7;

(2) Then, the user uses the control interface 313 to control the plural grabbing claw 44 to move vertically or horizontally, or even to rotate through the control of the first driving element 31, the second driving element 32, the rotary element 33, the main control 41, the first control unit 42, and the second control unit 43, by that the plural grabbing claws 44 can be moved to a location precisely above the cell stack where they are lowered and then enabled to grab the cell stack 1 by the sides thereof as the cell stack 1 is sandwiched between the top plate 2 and the bottom plate 3 in a secured manner by the screwing of the plural stud bolts 9;

(3) After confirming the cell stack 1 is being hold precisely by the plural grabbing claws 44 and the cantilever 411 is engaged exactly with the bottom plate 3, the user will instruct the robotic arm 40 to move the cell stack 1 away from the base 72 of the furnace 7 through the control interface 313 for placing the cell stack 1 in the deposit area 22 which is constructed at the top 21 of the frame 20; and (4) Thereafter, the user can again grab the handles 312 of the system 100 for pushing the same toward the fuel cell control system.

To sum up, the system for transporting planar solid oxide fuel cell (SOFC) stack is able to move a cell stack in and out of a high temperature furnace and then into a fuel cell control system smoothly and rapidly while preventing the cell stack from being damaged by tipping over, accidental collision or dropping, and it is a compact device that can be operated in an environment with limited space available for the operation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A system for transporting planar SOFC stack, comprising:
   a frame, for carrying a cell stack;
   a robotic arm, for grabbing and holding the cell stack; and
   a driver, coupled to the frame and the robotic arm and being used for driving the robotic arm;
   wherein the robotic arm comprises:
      a main control, disposed at the top of the driver;
      a first control unit, electrically and pivotally coupled to the main control by a support shaft for controlling the plural second control units;
      a plurality of second control units, electrically connected to the first control unit and the main control; and
      a plurality of grabbing claws, provided for one second control unit selected from the plural second control units to disposed thereat while being electrically connected to the main control, the first control unit, and the corresponding second control unit;
   wherein, the first control unit is arranged so as to rotate about the axis of the support shaft so as to bring along the plural second control units and the plural grabbing claws to rotate in a synchronized manner;
   wherein, the plural second control units are provided for respectively controlling the stretching of plural grabbing claws in a synchronized manner for grabbing and releasing the cell stack.

2. The system of claim 1, wherein the driver further comprising:
   at least one first driving element, each for driving the robotic arm to perform a movement in a direction parallel to a first direction;
   at least a second driving element, each for driving the robotic arm to perform a movement in a direction parallel to a second direction; and
   a rotary element, for driving the robotic arm to rotate.

3. The system of claim 2, wherein each first driving element is fitted to the frame while enabling the same to move relative to the movement of the frame.

4. The system of claim 3, wherein there are matching sliding chutes and sliding rails sandwiched between the at least one first driving element and the frame, provided for enabling the at least one first driving element to move relative to the movement of the frame.

5. The system of claim 2, wherein each second driving element is fitted to its corresponding first driving element while enabling the same to move relative to the movement of the corresponding first driving element.

6. The system of claim 1, wherein there are matching sliding chutes and sliding rails positioned between each second first driving element and its corresponding first driving element, provided for enabling the second driving element to move relative to the movement of its corresponding first driving element.

7. The system of claim 2, wherein the first direction is perpendicular to the second direction.

8. The system of claim 2, wherein each first driving element is arranged for enabling the same to move relatively to the movement of the frame in a vertical manner.

9. The system of claim 2, wherein each second driving element is arranged for enabling the same to move relatively to the movement of its corresponding first driving element in a horizontal manner.

10. The system of claim 2, wherein the rotary element further comprises: a first column and a second column, and the first and second columns are coaxially arranged while enabling one column selected from the two columns to be ensheathed by the other.

11. The system of claim 10, wherein the first column, being a hollow column, is arranged coaxial with the second column in a manner that the second column is ensheathed inside the first column.

12. The system of claim 11, wherein the second column is connected to a driving unit, provided for driving the second column to move.

13. The system of claim 12, wherein the driving unit is used for driving the second column to perform a rotation movement about the axis thereof and an axial movement in its axial direction.

14. The system of claim 10, wherein there is a swivel bearing arranged between the first column and the second column.

15. The system of claim 1, wherein the cell stack is fixedly sandwiched between a top plate and a bottom plate while preventing the same from moving by the screwing of a plurality of stud bolts respectively to the top and the bottom plates.

16. The system of claim 1, wherein each grabbing claw is padded with a foam sponge on a surface thereof having contact with the cell stack for achieving objects of stabilizing, shock absorbing, and protection.

17. The system of claim 1, wherein the first control unit is shaped like a flat rectangle having four equal sides while enabling each side of the first control unit to be provided for one of the plural second control units and one of the plural grabbing claws to disposed thereat.

18. The system of claim 1, wherein the main control further comprises a cantilever of a specific length, while enabling the first control unit, the plural second control units and the plural grabbing claws to be disposed at the bottom of the cantilever.

19. The system of claim 1, wherein there is a deposit area formed at the top of the frame, provided for carrying the cell stack.

20. The system of claim 19, wherein the deposit area is padded with a shock-absorbing foam sponge.

21. The system of claim 20, wherein the shock-absorbing foam sponge in the deposit area is padded in a detachable manner for facilitating the same to be replaced.

22. The system of claim 19, wherein the top of the frame is padded with a shock-absorbing foam sponge.

23. The system of claim 1, wherein there is a plurality of wheels being configured at the bottom of the frame, provided for enabling the frame to be movable.

24. The system of claim 1, further comprising:
a handle assembly, provided for a user to grab thereat and thus facilitating the user to move the whole transportation system.

25. The system of claim 24, wherein the handle assembly further comprises two handles, symmetrically arranged at the driver.

26. The system of claim 1, further comprising:
a control interface, provide for a user to control the driver.

27. The system of claim 26, wherein the interface control further comprises:
at least one joystick and at least one control button.

28. The system of claim 26, wherein the control interface is arranged at the driver.

* * * * *